United States Patent [19]

Yamamura et al.

[11] 3,783,319

[45] Jan. 1, 1974

[54] LAMINATED ROTOR TOOTH ASSEMBLY FOR AN ELECTRIC PULSE MOTOR

[75] Inventors: Sakae Yamamura, Tokyo; Seiuemon Inaba, Kawasaki, both of Japan

[73] Assignees: Fujitsu Limited, Kawasaki-shi; Fujitsu Fanuc Limited, Chiyoda-ku, Tokyo, both of Japan

[22] Filed: Aug. 21, 1972

[21] Appl. No.: 282,021

[30] Foreign Application Priority Data
Aug. 24, 1971  Japan.............................. 46/76000

[52] U.S. Cl. .............................................. 310/268
[51] Int. Cl. ............................................. H02k 1/22
[58] Field of Search ................................... 310/268

[56] References Cited
UNITED STATES PATENTS

| | | | |
|---|---|---|---|
| 3,466,479 | 9/1969 | Jarret et al. | 310/268 X |
| 3,467,845 | 9/1969 | Wesolowski | 310/268 X |
| 3,436,571 | 4/1969 | French | 310/268 X |
| 3,699,372 | 10/1972 | Abe et al. | 310/268 |

*Primary Examiner*—Gerald Goldberg
*Attorney*—Nelson E. Kimmelman et al.

[57] ABSTRACT

An electric pulse motor having a rotatably supported rotor including a plurality of equiangularly arranged rotor teeth carried by a support element and a stator assembly including a number of stator elements stationarily arranged around the rotor. The stator teeth of the stator assembly project toward one another across an air gap and both face the rotor teeth between them. Each of said plurality of rotor teeth is a laminated element made by stacking a plurality of laminations in the radial direction of the rotor.

10 Claims, 8 Drawing Figures

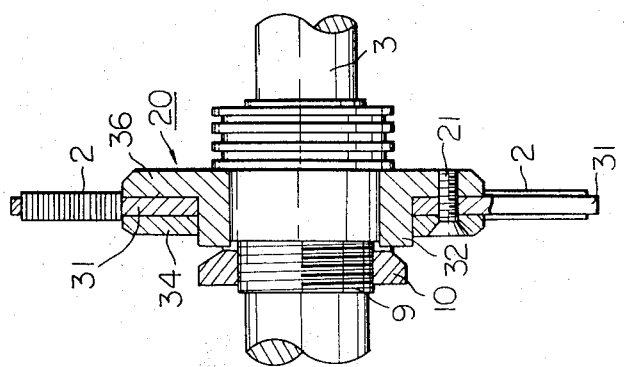
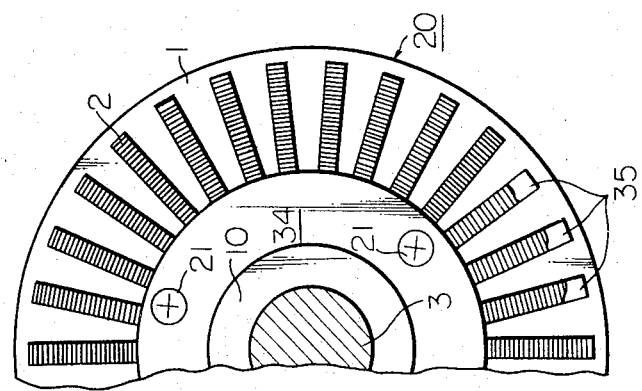
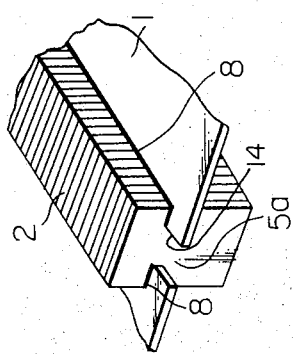

LAMINATED ROTOR TOOTH ASSEMBLY FOR AN ELECTRIC PULSE MOTOR

DESCRIPTION OF THE INVENTION

The present invention relates to an improvement of an electric pulse motor, more particularly to an improved rotor structure thereof.

The conventional electric pulse motor has a plurality of rotor teeth carried by a rotatable support member which are positioned in an air gap between axially opposed stator teeth so that the rotor teeth poles face the stator teeth poles. In this type of motor it is well known art to form the respective rotor teeth into laminated structures for the purpose of preventing generation of eddy current in the teeth.

These laminations of the rotor teeth are always stacked in a circumferential direction with respect to the central axis of the rotor. Consequently magnetic flux departing from the tooth pole of the excited stator can hardly flow through the tooth pole of the rotor in the circumferential direction due to magnetic reluctance in the rotor tooth resulting from the circumferential stacking of the laminations. As a result, the magnetic flux flowing in the above-mentioned direction is not strong enough to serve as the drive force for the rotor. Thus, only a relatively small part of the magnetic flux departing from the excited stator tooth pole is utilized to produce magnetic flux for driving the rotor. Therefore, the driving torque is limited in the conventional electric pulse motor.

If, in the above specified electric pulse motor, any one of the rotor teeth is out of alignment with facing stator teeth in the rotating direction of the rotor, magnetic flux departing from the stator teeth poles enters into both the front and side tooth poles of the rotor tooth. Magnetic attractive force is thus produced so as to rotate the rotor in the normal rotating direction. The amount of magnetic flux flowing to the side tooth pole of the rotor tooth increases with an increase of the circumferential non-aligment of the rotor tooth and with the stator teeth. However, in this conventional rotor tooth, such increasing magnetic flux can not flow through the rotor tooth due to magnetic reluctance resulting from the stacking of the laminations in the flowing direction.

Therefore, an object of the present invention is to obviate the above defect caused by the structure of the rotor tooth of the conventional electric pulse motor.

In accordance with one of the features of the present invention, each of the rotor teeth carried by a rotatable support member of the electric pulse motor is constituted by stacking laminations in the radial direction with respect to the central axis of the rotor. The eddy current generated in the rotor teeth is thereby extremely reduced and, as a result, the efficiency of the electric pulse motor can be increased. Simultaneously, there is an increase of driving torque generated, especially upon commencement of the stepping operation of the rotor by the effective use of magnetic flux flowing through the side tooth poles of the rotor teeth.

The invention will be more apparent, and secondary features as well as advantages will appear, in the course of the ensuing description of embodiments given by way of examples. Reference will be made to the accompanying drawings, in which:

FIG. 2a is a partially perspective view illustrating the laminated structure of a rotor tooth on an index support plate;

FIG. 2b is a perspective view of a lamination to be incorporated in the rotor tooth of FIG. 2a;

FIG. 3a and FIG. 3b are views similar to FIG. 1a and FIG. 1b, but showing another embodiment of the rotor according to the present invention;

Figure 1B:
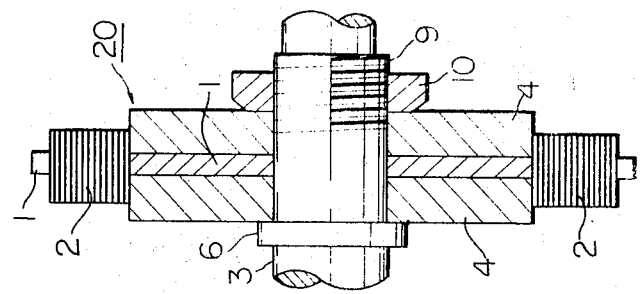
FIG. 1a and FIG. 1b are front and side elevation views partially sectional, of a rotor according to the present invention.

Referring to FIG. 1a thru FIG. 2b, an index support plate 1, having a plurality of insert slots 5 equiangularly arranged in the circumferential direction and having radial openings 5a at the outermost periphery of the index plate 1, is fixedly mounted on a rotor shaft 3. In the index support plate 1, rotor teeth 2, constituted by a plurality of laminations 7 each having notches 15 as shown in FIG. 2b, are inserted in each slot 5 from the direction along a plane parallel to the plate 1 through the openings 5a. The notches 15 of each rotor tooth engage the edges 14 of the slot 5 as shown in FIG. 2a. Rigid connection between the rotor teeth 2 and the support plate 1 is accomplished by means of, e.g., brazing or adhesion as shown by a reference numeral 8 in FIG. 2a, or by means of mechanical staking. The support plate 1 is provided with annular support parts 4 at the left and right sides thereof, for the purpose of reinforcement. The rotor 20 includes index plate 1, a plurality of rotor teeth 2, and support parts 4, abutting a flange portion 6 of rotor shaft 3. The rotor components are rigidly clamped by a nut 10 screwed onto the threaded portion 9 from the opposite side.

Figure 1A:
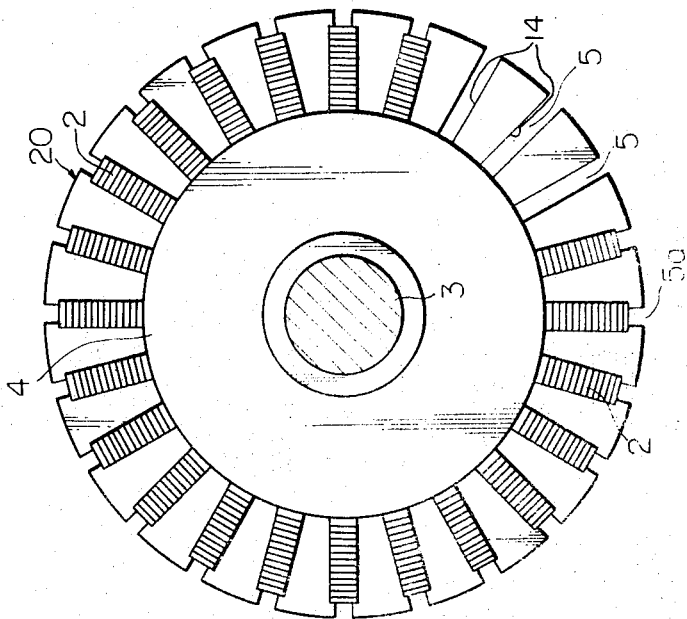

FIG. 3a and FIG. 3b show another but substantially the same rotor as FIG. 1a and FIG. 1b, and therefore, the same reference numerals show the same elements.

In FIG. 3a and FIG. 3b, an index support plate 31 is mounted on the rotor shaft 3 via a mounting ring 32, which is fixedly attached to the shaft 3 by a threaded portion 9 on which is screwed a nut 10. The support plate 31 is rigidly attached to the wider diameter annular portion 36 of the mounting ring 32 by fixing screws 21. The main difference between the rotor of FIGS. 1a and 1b and that of FIGS. 3a, 3b is that the outer openings 5a in index support plate 31 are not provided in the latter. Of course openings are provided at the innermost end of each index slot 35 for the purpose of easily inserting rotor teeth 2 therein, although they are not shown in the drawings. This construction assures safe retention of each rotor tooth 2 in each slot 35 under centrifugal force exerted on them during rotation of the rotor.

Figure 4A:
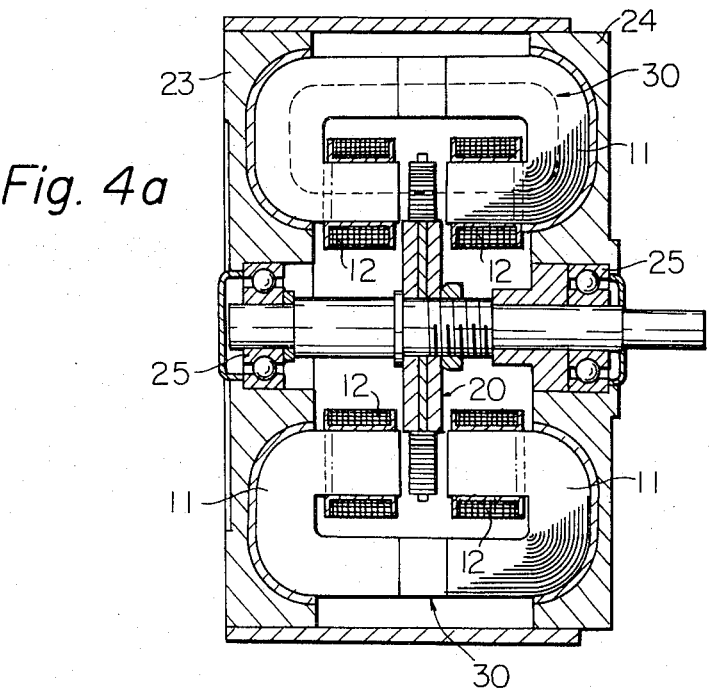
FIG. 4a is a longitudinal sectional view schematically showing a specified type of an electric pulse motor incorporating the rotor of the present invention.

FIG. 4a shows an example of an electric pulse motor incorporating the rotor as shown in FIGS. 1a and 1b. As shown in FIG. 4a, the rotor is rotatably supported by bearings 25 seated in the housing members 23, 24. Each rotor tooth 2 of the rotor has small axial air gaps on each side facing stator teeth 13. Each stator element 30 comprises of a pair of laminated cores 11, stator teeth 13 formed on an end surface of each core 11, and excitation windings 12 on the cores 11 for exciting the stator element 30. In this way laminations of each stator core 11 are stacked in the radial direction with respect to the central axis of the rotor at the tooth pole portions the same as the laminations of rotor tooth 2.

Figure 4B:
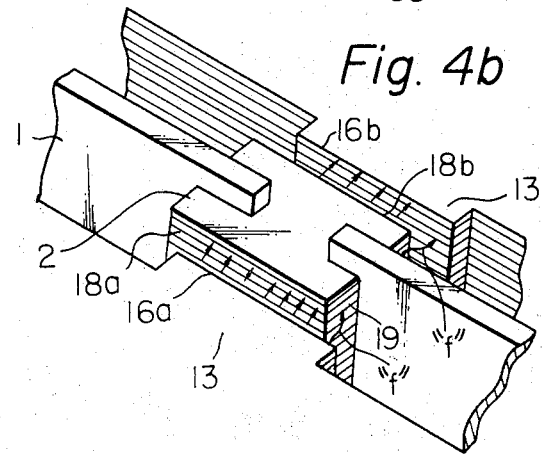
FIG. 4b is an enlarged partial perspective view of a rotor tooth and stator teeth illustrating magnetic flux flow in the rotor and stator teeth according to the present invention.

FIG. 4b shows an enlarged partial perspective view illustrating the facing arrangement of rotor tooth 2 and stator teeth 13.

According to the present invention, it will be understood that as the rotor tooth 2 is made of radially stacked laminations 7, magnetic flux departing from tooth pole 16a of stator tooth 13 flows through the front tooth pole 18a of rotor tooth 2 with a reduced amount of eddy current. (In the reverse direction, of course, the flux would flow from 16b through 18b.) In addition, magnetic flux departing from tooth pole 16a of stator tooth 13 flows through side tooth pole 19 (referring only to the forward side with respect to rotating direction of the rotor) of rotor tooth 2, as shown by symbol $f$ in FIG. 4b, without encountering substantial resistance from magnetic reluctance in the rotor teeth. As a result, the magnetic flux departing from tooth pole 16a, or 16b, of stator tooth 13 is effectively used to generate magnetic force between stator teeth 13 and rotor tooth 2. This effective use of magnetic flux is particularly advantageous for producing large torque upon the starting of the stepping operation of the specified kind of electric pulse motor.

Additionally in the present invention, as eddy current induced by magnetic flux flowing through side pole 19 of rotor tooth 2 is extremely reduced compared with the conventional rotor tooth, iron loss in the rotor tooth 2 can be very small.

The index support plate 1 or 31, for carrying a plurality of rotor teeth 2, is perferably made of non magnetic and non conductive material such as ceramic, epoxy-modified polyamide or glass epoxy material. This is in order to prevent generation of eddy current in the support plate 1, and leakage of magnetic flux from the rotor teeth into the index support plate.

We claim:

1. In an electric pulse motor having a rotor including a plurality of equiangularly arranged rotor teeth carried by a support element rotatably supported in a housing and including a stator assembly having a number of stator elements stationarily mounted in the housing around said rotor so that the stator elements face one another across an air gap in which said rotor teeth are disposed, an improvement wherein each of said plurality of rotor teeth comprises a plurality of substantially identical stacked laminations disposed along the transverse to radii from the center of said rotor.

2. An electric pulse motor as claimed in claim 1, wherein said stacked laminations are fixedly disposed in radial slots equiangularly formed in said support element, wherein said support element is a generally disc-shaped member, and wherein said laminations are arranged with their longitudinal axes aligned with one another in the plane of said support element.

3. An electric pulse motor as claimed in claim 2, wherein said support element for said rotor teeth is made of non-magnetic and non-conductive material and said stacked laminations project outwardly therefrom on both sides.

4. An electric pulse motor as claimed in claim 3, wherein each of said rotor teeth is adhesively connected to said slots in said support element.

5. An electric pulse motor including; a rotor rotatably supported in a housing and having a plurality of individually formed rotor teeth disposed in radially elongated slots equiangularly formed in a support element, and also including a plurality of stator elements stationarily mounted in the housing at equal spaces therebetween around the rotor, each of said stator elements having excitation windings and two axially opposing end portions between which said rotor teeth rotate, said rotor teeth being spaced equally from said stator elements by equal air gaps, each of said end portions having stator teeth formed at a tooth pitch equal to that of the rotor teeth, wherein said individual rotor tooth consists of a plurality of laminations stacked in the radial direction of said rotor, and said support element is made of non-magnetic and non-conductive material.

6. An electric pulse motor as claimed in claim 5, wherein said individual rotor tooth is fastened to said slot of said support element by means of adhesion and wherein said laminations are substantially identical to one another.

7. An electric pulse motor as claimed in claim 5, wherein said support element has a plate shape and, the axial width of each said individual rotor teeth is more than the thickness of said plate shape support element so that equal extensions are formed on both sides of said support element.

8. In an electric pulse motor according to claim 2, wherein said slots are closed off at their respective inner ends and said laminations are flat and substantially H-shaped.

9. In an electric pulse motor according to claim 2 wherein said slots are closed off at their respective outer ends and said laminations are flat and substantially H-shaped.

10. In an electric pulse motor according to claim 2 wherein each of said stator teeth comprises a plurality of laminations stacked in the same direction as said rotor laminations.

* * * * *